June 28, 1966 R. K. HELLMANN 3,258,726

BENDABLE POLE PIECES FOR ADJUSTMENT OF ITERATIVE NETWORKS

Filed Sept. 24, 1963

3,258,726

BENDABLE POLE PIECES FOR ADJUSTMENT OF ITERATIVE NETWORKS

Reinhard K. Hellmann, Westbury, N.Y., assignor to Hazeltine Research, Inc., a corporation of Illinois Filed Sept. 24, 1963, Ser. No. 311,012
4 Claims. (Cl. 336—110)

In the manufacture of multisection filters, such as lumped constant delay lines, electrical adjustment of performance characteristics is often desirable, for example, to minimize ripple in the attenuation versus frequency or impedance versus frequency characteristic. However, adjustable inductive or capacitive components of conventional design are often too expensive to justify their use in applications where large numbers of such components are required. Provision for simple, low-cost adjustable inductive components is therefore desirable.

Objects of this invention are to provide adjustable iterative networks which allows one or more of the following: avoidance of disadvantages of prior art device, simple and inexpensive manufacture, and ease of adjustment.

In accordance with the invention an adjustable iterative network comprises a plurality of cores of magnetic material, a plurality of electrical windings, one associated with each of the cores, at least one magnet and a plurality of magnetically intercoupled adjustable pole pieces coupling each magnet to a plurality of the cores; each pole piece being associated with one of the cores and each pole piece being individually bendable to change the degree of the magnetic coupling so as to adjust the inductance of its associated winding.

For a better understanding of the present invention, together with other and further objects thereof, reference is had to the following description taken in connection with the accompanying drawing, and its scope will be pointed out in the appended claims.

Figure 1:
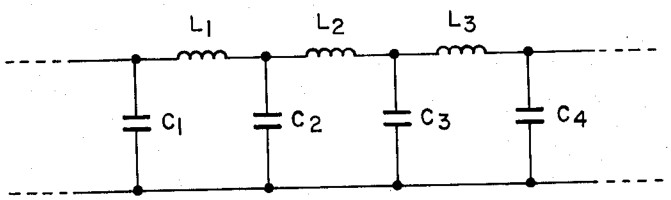
FIG. 1 illustrates a portion of an iterative network to which the invention is applicable.

Referring to FIG. 1, there is shown for purposes of illustration a schematic diagram of a portion of an iterative network to which the present invention is applicable. It will be seen that the network is shown as including only components having fixed reactances. The problem is that in practice it is expensive and troublesome to attempt to fabricate such a network using electrical components having exactly the value required. In accordance with the invention, such a network would be fabricated using fixed capacitors $C_1$–$C_4$ of approximately the desired value and inductive components $L_1$–$L_3$ constructed in accordance with the invention. Then, after fabrication the inductive components can be adjusted to give the desired over-all electrical characteristics.

Figure 2:
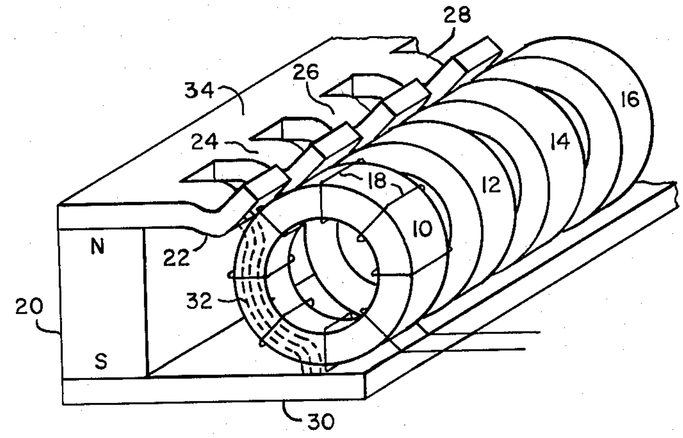
FIG. 2 shows an adjustable inductive network constructed in accordance with the invention.

Referring now to FIG. 2, there is shown one embodiment of an adjustable iterative network in accordance with the invention. As shown, there is included a plurality of cores of magnetic material, illustrated as toroidal-shaped cores 10, 12, 14 and 16 and a representative electrical winding 18, shown encircling the core 10 (for simplicity of drawing, the windings on cores 12, 14 and 16 are not shown). Also included in the illustrated embodiment is a magnet, shown as magnet 20, and a plurality of adjustable pole pieces, shown as iron pole pieces 22, 24, 26 and 28, which can be bent to adjust the degree of magnetic coupling between the magnet 20 and the cores 10, 12, 14 and 16. There is also shown a second pole piece 30, which may be made adjustable, or not, as desired. As shown, the lateral dimension of magnet 20 (the dimension perpendicular to a line between the poles) is determined by the length of the complete network.

In operation, the inductance of the winding 18, for example, is determined by the permeability of the core 10, by the number of turns, and by other well-known factors. The important point is that since the incremental permeability of the core 10 is one of the factors which determines the inductance, the inductance can be changed by varying the incremental permeability of the core 10. The incremental permeability of the core 10 can be varied by changing the amount of bias flux supplied by the permanent magnet 20. This bias flux is indicated in FIG. 2 by the dotted lines 32 flowing through the portion of the core 10 which is between the ends of the pole pieces 22 and 30. The amount of bias flux flowing through the core 10 can be changed by bending pole piece 22 so as to change the size or the gap between the end of the pole piece 22 and the core 10. Such bending can be accomplished using pliers or a simple tool similar to the tools commonly used for relay contact adjustment. After adjustment, the entire assembly can be potted if desired, using an appropriate potting compound chosen from the many which are commercially available.

Figure 3:
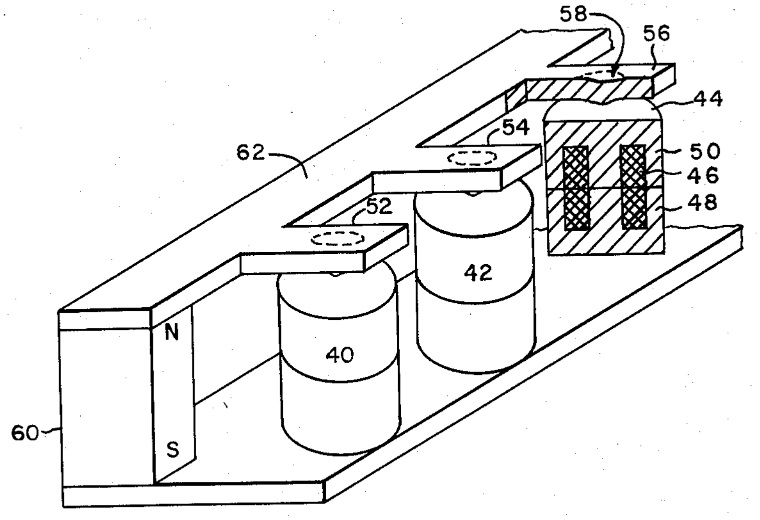
FIG. 3 shows another type of adjustable iterative network constructed in accordance with the invention.

Referring now to FIG. 3, there is shown an adjustable iterative network comprising a plurality of inductive components utilizing cores 40, 42 and 44 of the well-known cup core type. With reference to core 44, half of which has been removed to show internal construction, it will be seen that each of cores 40, 42 and 44 have a cylindrical coil, such as 46, associated with it. As shown, the coil 46 is surrounded by the two hollowed out core halves 48 and 50. In FIG. 3 the adjustable pole pieces are shown as simple rectangular pieces 52, 54 and 56 each having a dimple, such as 58, over the center of the associated core.

The principal difference between the FIG. 2 and FIG. 3 arrangements is that in FIG. 3, two smaller magnets are used instead of the single large magnet 20 of FIG. 2. One of these magnets is shown as 60 and the other magnet would occupy a similar position at the other end of the complete network. Alternatively, in a network utilizing a large number of cores, additional magnets could be inserted periodically (between each group of six cores for example).

In both FIGS. 2 and 3, the pole pieces are shown as effectively forming the tines of a long comb-like piece (34 in FIG. 2 and 62 in FIG. 3). The operation and adjustment of the FIG. 3 arrangement are substantially the same as described in connection with FIG. 2.

In designing networks in accordance with the invention possible effects of intercoupling between adjacent coils must be considered, however, with the type of coils and cores shown it is believed that such effects will be negligible. The adjustable iterative networks may also include associated components, for example, capacitors arranged to form a network resembling that shown in FIG. 1. After adjustment, the entire network can be potted as noted above, if desired.

The present invention is especially suited to applications involving small toroidal or cup-type cores as shown. No really satisfactory solution to the problem of adjusting the inductance of such cores is available in the prior art.

While there have been described what are at present considered to be the preferred embodiments of this invention it will be obvious to those skilled in the art that various changes and modifications may be made therein without departing from the invention and it is, therefore, aimed to cover all such changes and modifications as fall within the true spirit and scope of the invention.

What is claimed is:

1. An adjustable iterative network comprising:
a plurality of cores of magnetic material;
a plurality of electrical windings, one associated with each of said core;
at least one magnet;
and a plurality of magnetically intercoupled adjustable pole pieces coupling each magnet to a plurality of said cores, each pole piece being associated with one of said cores and each pole piece being individually bendable to change the degree of said magnetic coupling so as to adjust the inductance of its associated winding.

2. An adjustable iterative network comprising:
a plurality of cores of magnetic material;
a plurality of electrical windings, one associated with each of said cores;
a single magnet;
and a plurality of magnetically intercoupled adjustable pole pieces, each pole piece magnetically coupling said magnet to one of said cores and each pole piece being individually bendable to change the degree of said magnetic coupling so as to adjust the inductance of its associated winding.

3. An adjustable iterative network comprising:
a plurality of toroidal cores of magnetic material;
a plurality of electrical windings, one encircling each of said cores;
at least one permanent magnet;

and a plurality of magnetically intercoupled adjustable iron pole pieces coupling each magnet to a plurality of said cores, each pole piece being associated with one of said cores and each pole piece being individually bendable to change the degree of said magnetic coupling so as to adjust the inductance of its associated winding.

4. An adjustable iterative network comprising:
a plurality of cup-type cores of magnetic material;
a plurality of electrical windings, one encircling each of said cores;
at least one permanent magnet;
and a plurality of magnetically intercoupled adjustable iron pole pieces coupling each magnet to a plurality of said cores, each pole piece being associated with one of said cores and each pole piece being individually bendable to change the degree of said magnetic coupling so as to adjust the inductance of its associated winding.

References Cited by the Examiner

UNITED STATES PATENTS

| | | | |
|---|---|---|---|
| 2,740,110 | 3/1956 | Trimble | 336—132 X |
| 2,856,578 | 10/1958 | Coleman et al. | 336—165 |
| 2,989,710 | 6/1961 | Gelzer et al. | 336—20 |

ROBERT K. SCHAEFER, *Primary Examiner.*

T. J. KOZMA, *Assistant Examiner.*